Re. 24201
July 28, 1953      M. C. ADDICKS      2,646,965
DEVICE FOR HANDLING GRANULAR MATERIAL
Filed Feb. 2, 1951      5 Sheets-Sheet 1
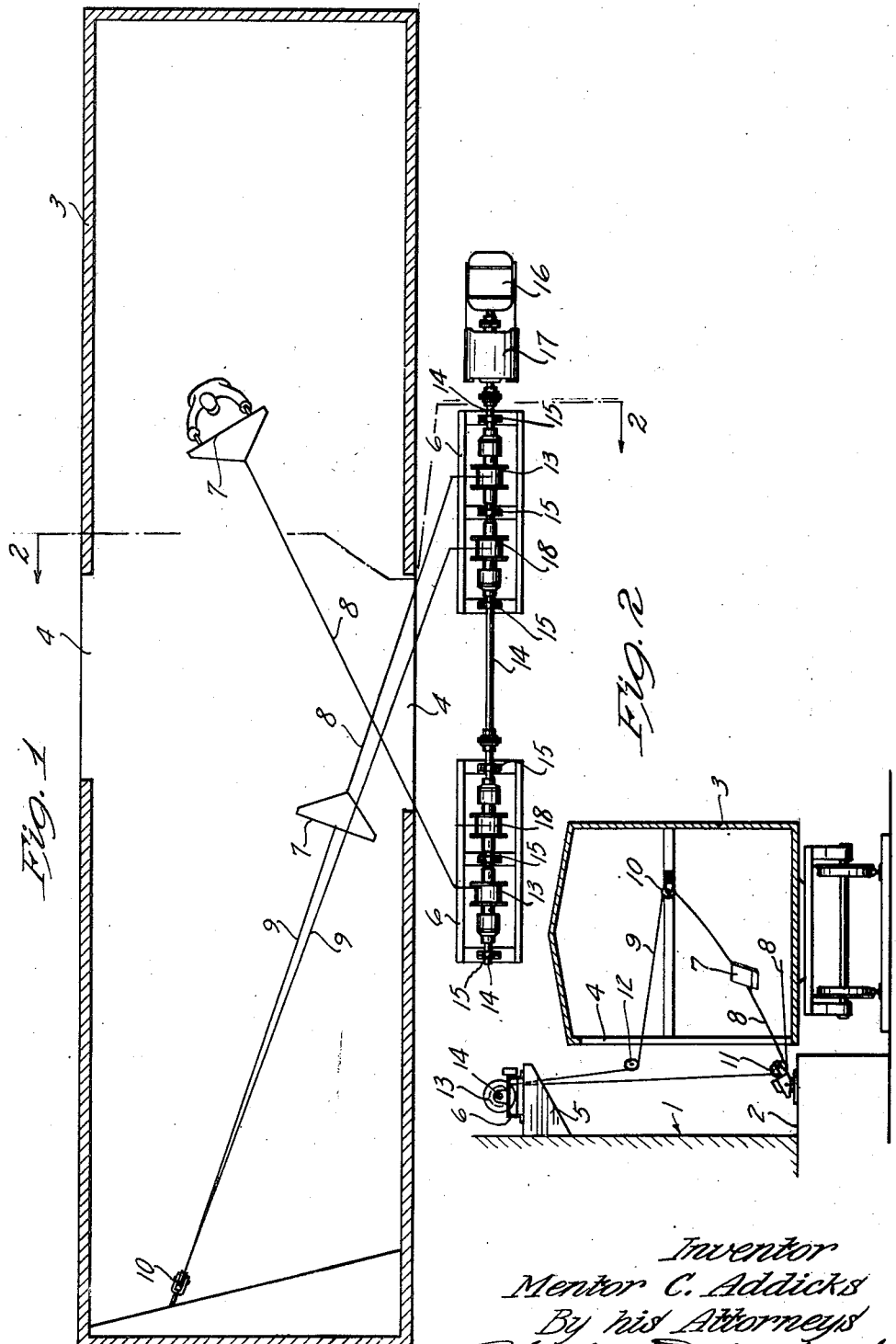
Inventor
Mentor C. Addicks
By his Attorneys
Merchant & Merchant

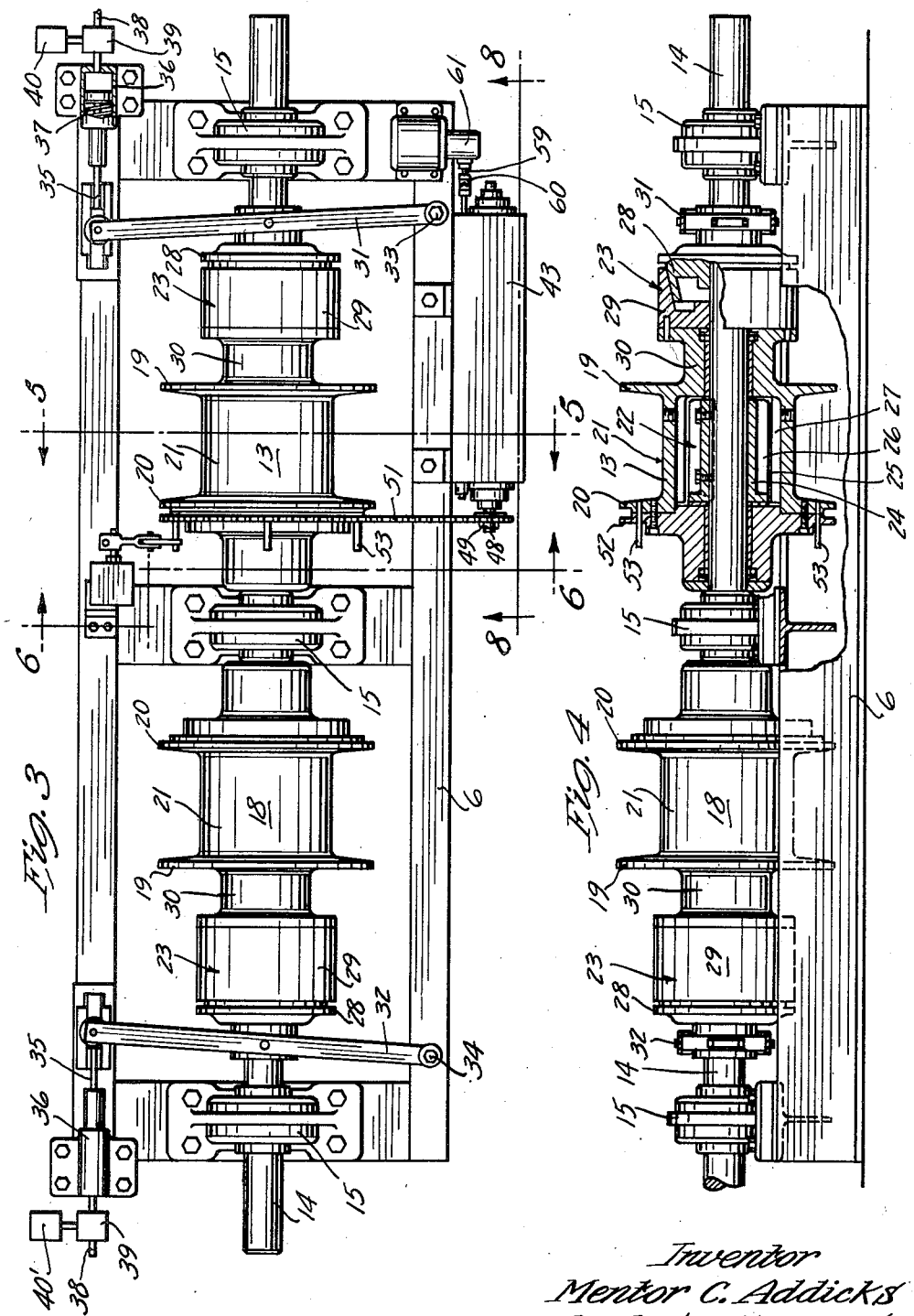

July 28, 1953   M. C. ADDICKS   2,646,965
DEVICE FOR HANDLING GRANULAR MATERIAL
Filed Feb. 2, 1951   5 Sheets-Sheet 3
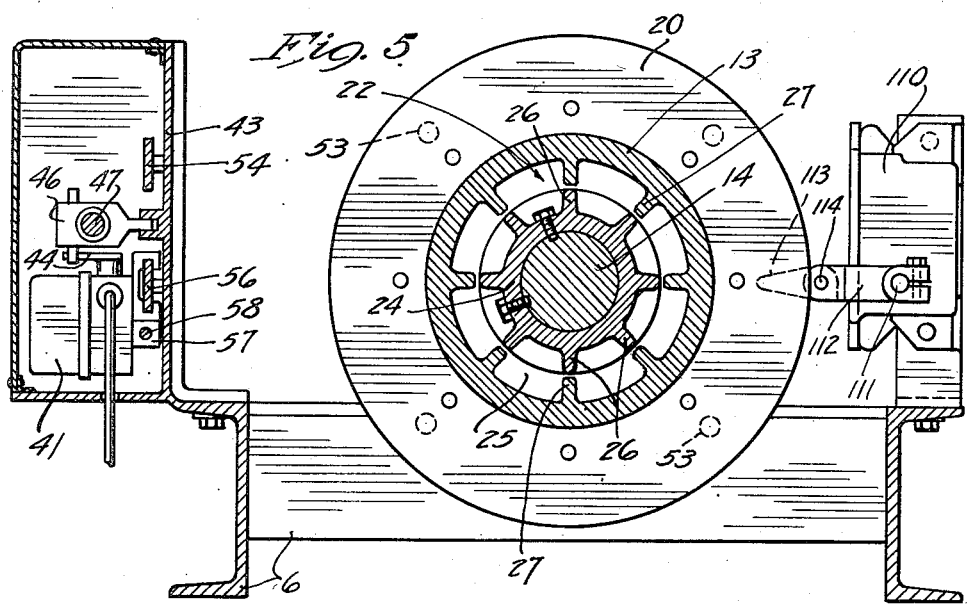
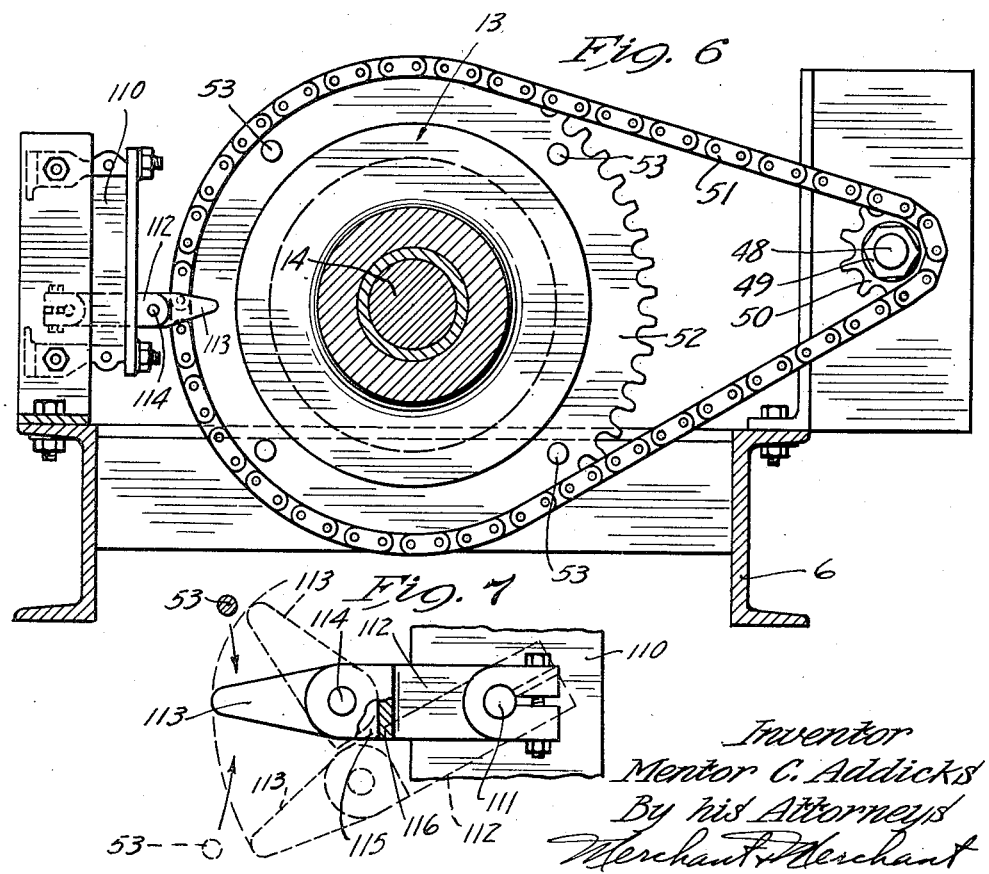
Inventor
Mentor C. Addicks
By his Attorneys
Merchant & Merchant July 28, 1953        M. C. ADDICKS        2,646,965
DEVICE FOR HANDLING GRANULAR MATERIAL
Filed Feb. 2, 1951        5 Sheets-Sheet 4
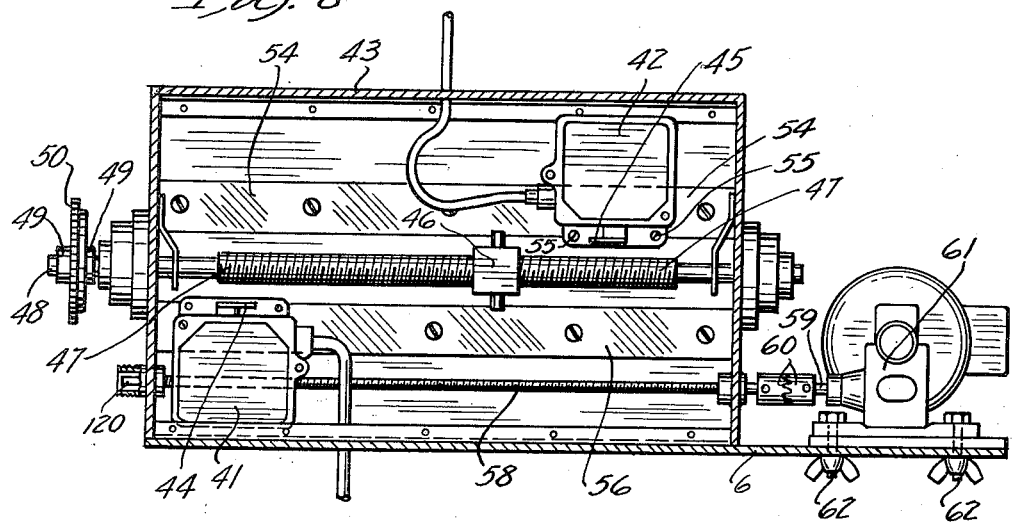
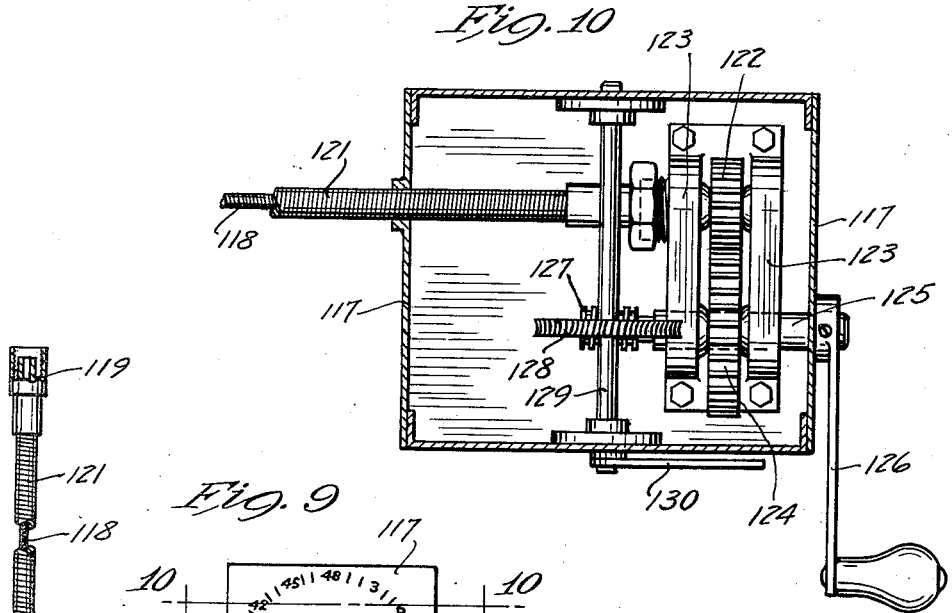
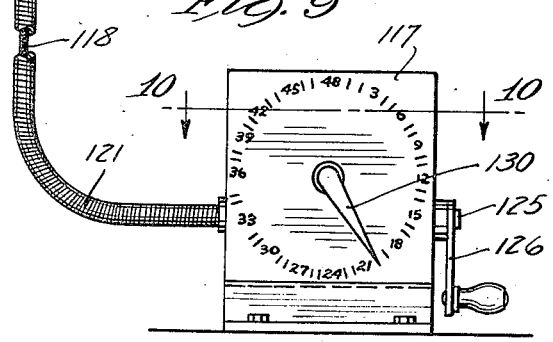
Inventor
Mentor C. Addicks
By his Attorneys
Merchant & Merchant July 28, 1953 M. C. ADDICKS 2,646,965
DEVICE FOR HANDLING GRANULAR MATERIAL
Filed Feb. 2, 1951 5 Sheets-Sheet 5

Fig. 11

Inventor
Mentor C. Addicks
By his Attorneys
Merchant & Merchant

Patented July 28, 1953

2,646,965

UNITED STATES PATENT OFFICE 2,646,965

DEVICE FOR HANDLING GRANULAR MATERIAL

Mentor C. Addicks, Minneapolis, Minn.

Application February 2, 1951, Serial No. 209,175

10 Claims. (Cl. 254—173)

My invention relates generally to machines for handling granular or bulk material and more specifically to improved mechanisms for unloading granular material from freight cars and the like.

An important object of my invention is the provision of a machine for removing bulk material from freight or box cars and the like which, when applied to a loaded car, is entirely automatic in its operation in removing all but a minimum quantity of the material from the car.

Another important object of my invention is the provision of a car unloading machine of the type set forth which may be quickly and easily changed from fully automatic operation to manually controlled semi-automatic operation for the purpose of unloading the relatively small quantity of material remaining in the car after automatic unloading thereof is completed.

Another object of my invention is the provision of an unloading machine of the above type which precludes the necessity of an operator's presence within the car during the greater part of the unloading operation, thereby avoiding exposure of the operator to the dust stirred up in the car during the unloading thereof.

Another object of my invention is the provision of a grain shoveling machine as set forth having a traveling shovel or scoop, the extent of travel of which may be automatically varied during the unloading operation so that the scoop is caused to travel progressively further away from the point of discharge with each successive shoveling operation.

Another object of my invention is the provision of novel control means whereby the amount of travel of the shovel may be varied by the operator stationed exterior of the car or bin.

Still another object of my invention is the provision of an automatic shoveling machine comprising winding drums and a drag or scoop connected to the drums by flexible cables for reciprocatory material shoveling and return movements, in which novel means is provided for accurately maintaining the extent of reciprocatory travel of the scoop or shovel irrespective of the manner in which the cables wind upon or unwind from their respective winding drums.

Another important object of my invention is the provision of novel driving connections for the cable winding drums above mentioned whereby to prevent backlash in the cable being unwound. For this purpose, I provide novel driving connections for the winding drums which include transfer coupling means which urge the drums in a cable winding direction of rotation but which permit cable unwinding rotation of said drums.

Heretofore, in car unloading or shoveling machines where a scoop or shovel is operated by a drag line utilizing a tail sheave secured to one end of the bin or car, difficulty has been experienced when it has been necessary to move said tail sheave adjustably toward or away from the winding drums of the shoveling machine by reason of the fact that control switches for the winding drums would have to be manually moved or adjusted to compensate for variations in distance of shovel travel, or the cable must be manually lengthened or shortened according to the position of the tail sheave without disturbing the relative positions of the winding drums and control switches therefor. These operations consume valuable time and perfect adjustment is not always possible. Another object of my invention is, therefore, the provision of a shoveling machine utilizing a tail sheave in which said tail sheave may be readily moved with respect to the winding drums without loss of time and without the necessity of adjustment of associated parts. Such movement of the tail sheave will simply cause added cable to be drawn from the drum which is used to pull the shovel in the direction of its return movement toward the tail sheave.

A still further object of my invention is the provision of a shoveling machine as set forth which is relatively simple and inexpensive to manufacture and install, which is highly efficient in operation, and which is rugged in construction and durable in use.

Other highly important objects and advantages of my invention will become apparent from the following detailed specification, appended claims, and attached drawings.

Referring to the drawings which illustrate the invention, and in which like characters indicate like parts throughout the several views:

Fig. 1 is a diagrammatic view in plan illustrating a preferred embodiment of my improved shoveling machine and its use in unloading a freight car or the like;

Fig. 2 is a vertical section taken substantially on the line 2—2 of Fig. 1;

Fig. 3 is a view in plan of my novel shoveling machine, some parts being removed;

Fig. 4 is a view in side elevation of the structure of Fig. 3, some parts being removed, some parts being broken away, and some parts shown in section;

Fig. 5 is an enlarged transverse section taken substantially on the line 5—5 of Fig. 3;

Fig. 6 is an enlarged transverse section taken substantially on the line 6—6 of Fig. 3;

Fig. 7 is an enlarged fragmentary detail of a portion of Fig. 5, illustrating the operation of the trip switch operating lever of my invention;

Fig. 8 is an enlarged view partly in front elevation and partly in section taken substantially on the line 8—8 of Fig. 3 and illustrating a preferred form of control mechanism of my invention;

Fig. 9 is a fragmentary view in front elevation of a modified form of control device adapted to be used in connection with a portion of the control mechanism of Fig. 8;

Fig. 10 is an enlarged view in section taken substantially on the line 10—10 of Fig. 9; and Fig. 11 is a wiring diagram.

Referring with greater detail to the drawings and particularly to Figs. 1 and 2, the numeral 1 indicates a suitable building such as a grain elevator or the like having a receiving platform 2 adjacent a pair of tracks upon which moves and is adapted to rest a conventional box car or the like 3. The receiving platform 2 is conventional in nature and is adapted to receive granular material such as grain or the like from the car 3 as the grain is shoveled or otherwise moved through the customary opening 4 in the side of the car 3 and at its central portion. Mounted on the building 1 and carried by suitable brackets or the like 5 is a supporting structure or frame 6 having mechanism therein for imparting reciprocatory grain shoveling and return movements to a scoop or shovel 7 which is adapted to be moved between one end portion of the car 3 and the intermediate door opening 4 thereof. The shovel 7 is of the type commonly used to move grain or like bulk material from one part of a room such as a grain bin to another, or as shown, unloading grain or like material from a box car. The scoop is connected to the shoveling machine for movements in a car unloading direction by a flexible cable 8 and to the shoveling machine for return movements by a second cable 9 which runs over a tail sheave shown diagrammatically in Figs. 1 and 2 and indicated at 10. The tail sheave is of the type commonly used for this purpose and may be secured to either end portion of the box car in a suitable and well known manner. For the purpose of clarity, the cable 8 will be hereinafter designated as the pull-forward cable and the cable 9 as the return cable.

Inasmuch as the shoveling machine mounted in the supporting structure 6 is preferably mounted above the level of the door opening 4 of the box car 3, see Fig. 2, suitable pulleys for guiding the pull-forward cable 8 and the return cable 9 are provided at convenient locations and suitably secured in positions to properly guide said cables. One of the guide pulleys, indicated at 11, is mounted closely above the level of the floor of the car 3 while the pulley for the return cable 9 is mounted at a level above the pulley 11, by suitable means not shown, this second pulley being indicated by 12.

The pull-forward cable 8 has its free end secured to a cable winding drum 13 that is journalled on a power driven shaft 14 which is in turn journalled in suitable bearings 15 in the supporting structure of the frame 6. Rotary movement is imparted to the shaft 14 by a prime mover such as an electric motor 16 through conventional speed reduction gearing not shown but contained within a housing 17. The free end of the return cable 9 is secured to a second cable winding drum 18 which is also journalled on the shaft 14 in axially spaced relationship to the winding drum 13. The drums 13 and 18 are in the nature of spools having radially outwardly projecting end flanges 19 and 20 and, as clearly shown in Figs. 3 and 4, have relatively smooth cable-engaging surfaces 21 over which the cables 8 and 9, respectively, are wound. As indicated in Figs. 1 and 2, both the pull-forward cable 8 and the return cable 9 are wound on their respective drums 13 and 18 in the same direction of rotation for a purpose which will hereinafter become apparent.

The drums 13 and 18 are each coupled to the drive shaft 14 by power transmission mechanism comprising a low torque transfer coupling 22 and a releasable high torque transfer coupling 23. The low torque transfer coupling of each drum comprises a central tubular member 24 rigidly secured to the drive shaft 14 within an annular chamber 25 defined by the shaft 14 and the winding drum. The tubular chamber 24 is provided with a plurality of longitudinally extending axially outwardly projecting blades or vanes 26 which terminate radially inwardly of an arc defined by the radially inner edges of a plurality of circumferentially spaced vanes or blades 27 integrally formed with and projecting radially inwardly from the intermediate portion of each of the drums 13 and 18. The chamber 25 is at least partially filled with suitable liquid such as lubricating oil or hydraulic brake fluid which acts as a lubricant for the bearings 15 in addition to providing a driving medium between the blades 26 of the sleeve 24 and the vanes 27 integral with the drums. Rotation of the shaft 14 being relatively slow, a low torque is imparted to the drums 13 and 18 in a direction to wind the cables thereon. When the cable is drawn from either of the drums 13 or 18, said drums rotate in a direction opposite that of the drive shaft 14 thereby causing a greater speed differential between the unwinding drum and the drive shaft 14 and causing a greater drag to be placed upon the unwinding drum. This arrangement prevents any overrunning of either of the drums in a direction to unwind the cable therefrom and consequent possible backlash or entanglement of the unwinding cable. In other words, both the pull-forward cable 8 and return cable 9 are always maintained under relatively low tension during rotation of the drive shaft 14.

The high torque transfer coupling unit for each winding drum comprises a pair of clutch elements 28 and 29 the former of which is keyed or otherwise secured to the drive shaft 14 for common rotation therewith and for axial sliding movements with respect thereto, and a clutch element 29 rigidly secured to an axially extended portion 30 of one of the drums 13 and 18. The clutch elements 28 are each independently moved by shifter levers 31 and 32 pivotally mounted on the supporting structure or frame 6, as indicated at 33 and 34, respectively. The shifter levers 31 and 32 are preferably pneumatically controlled each being connected at their free ends to one of a pair of guided piston plungers 35 each of which is mounted for extending and retracting movements in a fluid pressure cylinder 36 and biased by spring means 37 in a direction to disengage the clutch elements 28 and 29. Air under pressure is supplied selectively to the cylinders 36 through conduits 38 from a source of pressure, not shown, and control thereof is effected by conventional valves 39 operated by actuators in the nature of solenoids 40 and 40'. The solenoid 40 controls the action of the clutch 23 associated with the forward pull drum 13 whereas the solenoid 40' controls the action of the clutch 23 associated with the return drum 18.

When the novel shoveling machine is used for automatic unloading of a freight car or the like, the extent of rotary movement of the winding drums 13 and 18 is controlled by the positioning of a pair of limit switches 41 and 42 mounted in a casing or the like 43. The switches 41 and 42 are provided with operating arms 44 and 45, respectively, which are adapted to be engaged by a tripping member 46 which has screw-threaded engagement with a lead screw or the like 47 journalled in opposite ends of the casing 43 and having a diametrically reduced outer end 48 which extends outwardly of the casing 43 and which is threaded to receive clamping nuts 49 one each disposed on opposite sides of a sprocket wheel or the like 50 slidably mounted on the shaft end 48. The sprocket wheel 50 is adapted to be rotated by an endless link chain 51 running thereover and a relatively large sprocket wheel 52 anchored to the flange 20 of the drum 13 by pins or the like 53. The switch 42 is slidably mounted on a mounting bar or plate 54 and clamped thereto by means of clamping screws or the like 55, whereas the switch 41 is mounted for sliding movements on an elongated mounting plate or bar 56, see particularly Figs. 5 and 8. The switch 41 is provided with a threaded lug 57 which has threaded engagement with an adjusting screw 58 journalled in the opposite ends of the casing 43. With particular reference to Figs. 3 and 8, it will be seen that a projected end of the adjusting screw 58 is coupled to a drive shaft 59 by means of a shaft coupling 60, the drive shaft 59 projecting outwardly from a conventional motorized gear reducer 61 slidably mounted on the supporting structure 6 and clamped in position by wing-nut-equipped clamping screws or the like 62.

As illustrated in Fig. 1, a pair of my novel car shoveling machines may be used to advantage to quickly unload bulk material from the box car 3. As there shown, one of the shoveling machines is used to function automatically while the other thereof is used semi-automatically, the return cable 9 being disconnected from the scoop 7 and an operator manually moving the scoop toward one end of the car 3 for the final clean-up operation. During the automatic unloading period, it is desirable to move the scoop or shovel 7 in relatively short operational cycles or strokes and gradually lengthen said strokes toward the tail sheave 10 at the end of the car 3 as the car becomes partially emptied. This gradual lengthening of the shovel stroke is accomplished through the movement of the limit switch 41 in a direction from the right to the left with respect to Fig. 8. Obviously, as the distance between the switches 41 and 42 increases, the tripping member 46 must travel a greater distance between the switches thereby causing the winding drums to execute a greater number of turns between the operation of one switch by the operating member 46 and the operation of the other switch thereby. The motorized speed reducer 61 which rotates the adjusting screw 58 for the limit switch 41 may be controlled by any suitable means, not shown, or by manually operated switches, if desired.

Electrical control means is diagrammatically illustrated in Fig. 11 and comprises the switches 41 and 42, the solenoids 40 and 40' and apparatus now to be described. The solenoid 40 is interposed in an electrical circuit which includes a pair of power leads 63 and 64 and a pair of serially connected normally open relay operated switches 65 and 66. The solenoid 40' is interposed in a circuit including a portion of the power lead 63, a lead 67, and a portion of the power lead 64. A pair of normally open serially connected relay operated switches 68 and 69 are also interposed in the lead 67 on opposite sides of the solenoid 40'. The switches 65 and 66 are adapted to be closed by energization of a relay coil 70 contained in a circuit comprising a portion of the power lead 63, a lead 71 which terminates in a contact 72 of the switch 42 which is normally connected to a switch contact 73 therein by a switch arm 74, a lead 75 extending from the switch contact 73 to one side of a manually operated starting and reset switch 76, a lead 77 extending from the other side of the reset switch 76 to the relay coil 70 and in which is interposed a manually operated master switch 78 and a time delay relay operated switch 79, and a lead 80 extending from the opposite side of the relay coil 70 to the power lead 64. The switch 79 is operated by a time delay relay 81 the winding of which is contained in a lead 82 shunting the switch 79 and the relay coil 70. A holding circuit for the relay 70 comprises a lead 83 one end of which is connected to the lead 75 and the other of which is connected to the lead 77 between the reset switch 76 and the master switch 78, and a normally open switch 84 closed by energization of the relay winding 70.

The normally open switches 68 and 69 for energizing the solenoid 40' are closed by energization of a relay winding 85 in a circuit including a portion of the power lead 64, a lead 86 extending therethrough from said lead 64 and therefrom to a switch contact 87 of the switch 41 and normally connected to a cooperating switch contact 88 by a contact arm 89, a lead 90 extending from the contact 88 to a contact 91 in the switch 42 normally out of electrical engagement with a cooperating switch contact 92 and adapted to be connected therewith by a contact arm 93 mounted for common movements with the contact arm 74, a lead 94 extending from the switch contact 92, a portion of the lead 71, and a portion of the power lead 63. A manually operated master switch 95 is interposed in the lead 94. A holding circuit for the relay coil 85 includes a lead 96 extending from the lead 90 to the lead 94 and a holding switch 97 interposed in said lead 96, said holding switch 97 being closed responsive to energization of the relay coil 85. In order that the controls may be automatically reversed once the cycle of automatic operation has been initiated by closing of the starting and reset switch 76, a circuit is provided which shunts out the switch 76 and which circuit comprises a lead 98 extending from the lead 75 to a switch contact 99 that is in normal switch open relationship to a cooperating switch contact 100 and adapted to be connected therewith by a switch arm 101 mounted for common movements with the switch arm 89, and a lead 102 extending from the switch contact 100 to the lead 77 between the reset switch 76 and the master control switch 78. With further reference to Fig. 11, it will be noted that coil springs 103 and 104 bias their respective switch arms 93 and 101 toward switch open positions and their respective switch arms 74 and 89 toward switch closed positions.

Automatic shoveling operation

When it is desired to use my shoveling machine to automatically unload grain or the like from a freight car, the operator fastens the tail sheave 10 to the interior of the car 3 in the conventional manner and adjacent one end thereof. Assuming that constant rotation is being imparted to the drive shaft 14 by the motor 16 and that the control switches 41 and 42 and the switch operating element 46 are initially located properly with respect to each other within the casing 43, the operator manually closes the master control switches 78 and 95 and the starting and reset switch 76 thus completing a circuit between the power leads 63 and 64 and the time delay relay winding 81 through the lead 71, the switch contacts 72 and 73, the leads 75, the starting and reset switch 76, lead 77, the master control switch 78, part of the lead 77, the lead 82, and a portion of the lead 80. Energization of the time delay relay 81 closes the switch 79 and causes the relay 70 to be energized whereby to close the switches 65 and 66 and energizing the winding of solenoid 40. As hereinbefore described, energization of the solenoid 40 admits fluid under pressure to the cylinder 36 associated with the forward pull drum 13 so that the piston-equipped plunger rod 35 and the lever 31 will be moved in a direction to cause the clutch elements 28 and 29 of the clutch 23 associated with the forward pull drum 13 to be operatively engaged whereby high torque rotary cable winding movement will be imparted to the drum 13. This rotation will pull the scoop 7 forwardly in the direction of the door opening 4 of the car 3 and a quantity of grain or like material moved toward the opening 4 thereby. As above indicated, cable winding movement of the drum 13 will cause rotary movement of the lead screw 47 in a direction to move the switch operating member 46 toward the operating lever 45 of the switch 42. This engagement will cause the contact arm 74 to move out of engagement with the contacts 72 and 73, and the contact arm 93 to move into operative engagement with the contacts 91 and 92 whereby to de-energize the relay 70 and complete a circuit through the winding of relay 85 to energize the same. Energization of the relay 85 will cause the switches 68 and 69 to close and complete a circuit from the power leads 63 and 64 through the solenoid 40' to cause high torque coupling engagement of the return pull drum 18. Obviously when the relay 70 is de-energized, the switches 65 and 66 are opened, de-energizing the solenoid 40 and disengaging the high torque coupling associated with the forward pull drum 13. Cable winding rotation of the return drum 18 moves the scoop 7 in a return direction toward the tail sheave and causing the forward pull drum 13 to unwind against action of the low torque transfer coupling 22 until the switch operating member 46 is moved under reverse rotation of the drum 13 to a point where it engages the operating lever 44 of the switch 41. With reference to Fig. 2, it will be seen that the return cable 9 is secured to the rear side of the scoop 7 adjacent its upper edge portion and that the forward-pulling cable 8 is attached to the scoop 7 adjacent the lower edge thereof. This arrangement permits the scoop to slide over the material in the car on its return movement and to dig into the material during the forward unloading movement thereof. It should further be noted that when the switch operating member 46 leaves the switch 42 during the return movement of the shovel, the energizing circuit for the relay 85 is broken through the switch connections 91, 92, and 93 by the spring 103. However, a holding circuit for the relay 85 has been set up through the switch 97 so that the solenoid 40' will be energized until the operating arm again reaches the switch 41. When the shovel has reached its predetermined limit of travel in a return direction, the switch operating member 46 will engage the switch operating arm 44 to cause disconnecting of the contacts 87 and 88 by the contact arm 89 thereby de-energizing the relay 85 and the solenoid 40'. Substantially simultaneously, the contact arm 101 engages the contacts 99 and 100 to energize the time delay relay 81. The relay 81 consumes sufficient time before closing the switch 79 to permit scoop 7 to dig itself into the material in the car before the solenoid 40 is re-energized to cause the scoop again to be pulled forwardly toward the car door opening 4. The operating cycle is then repeated until that portion of the car traversed by the scoop 7 is substantially cleaned.

It should be borne in mind that during this operation, the motorized gear reducer 61 is operated to cause the switch 41 to be very slowly moved in a direction away from the switch 42 so that each succeeding return movement of the scoop 7 terminates in more closely spaced relationship to the tail sheave 10 than did the preceding return travel of the scoop 7. This is a feature of the invention which avoids overloading of the scoop 7 and consequent excessive strain on the cable 8 and other working parts of the machine. It should also be noted that initially, the forward pull cable 8 and the return cable 9 are evenly wound upon their respective drums 13 and 18. My novel arrangement of operation of the mechanism for operating the switches 41 and 42 is not affected by uneven piling up of the pull-forward cable 8 on the drum 13 for the reason that the forward pull drum 13 must make an equal number of rotations in a cable unwinding direction to operate the switch 41 as it made to operate the switch 42, notwithstanding the fact that the cable return drum 18 rotates a greater number of times than does the drum 13 in the event that cable piles up unevenly on the drum 13. This is a feature of my invention which overcomes a difficulty long experienced in the art.

When it is desired to locate or relocate the tail sheave 10 in the car to a point of greater distance with respect to the drum 18, it is necessary for the operator to merely pull the sheave against the urging force of the low torque transfer coupling 22 of the pull back drum 18 to the desired location where said tail sheave is again made fast. If the sheave 10 is to be relocated at a point nearer the shoveling machine, the low torque transfer coupling 22 of the pull back drum will cause rotation of said drum 18 in a cable winding direction to immediately take up the slack in the cable 9. The relatively low torque of the low torque transfer coupling 22 of the drum 18 allows the operator to relocate the sheave 10 without uncoupling the cable 9 from the scoop or shovel 7. The weight of the scoop 7 together with the torque of the low torque transfer coupling in the drum 13 will prevent the scoop 7 and cable 8 from moving, thereby permitting only the cable 9 to be lengthened or shortened when relocating the tail sheave 10.

It will be appreciated that the low torque transfer couplings 22 tend to rotate the drums 13 and 18 in a cable winding direction when said drums are stationary, this tendency being even greater when either of said drums are rotating in a cable unwinding direction by reason of the fact that the differential of speed of rotary movement between the blades 26 and the vanes 27 is greater. It is this feature of the invention which prevents overrunning of the unwinding drum when the scoop 7 has reached either limit of movement within the car 3 and consequent backlashing of the cable. It should also be obvious that when it is desired to stop the shoveling operation at any time or for any reason, it is merely necessary that the operator open the master control switches 78 and 95. The invention further contemplates conventional safety switch means, not shown, for shutting off the motorized gear reducer 61 when the limit switch 41 is moved a predetermined distance away from the switch 42 whereby to prevent the scoop 7 from striking the tail sheave 10 during its return movements. The several manually operated switches such as the master control switches 78 and 95 and the starting and reset switch 76 are preferably located conveniently to the operator and exterior of the car 3 so that the operator need not enter the car except to initially place or later reset the tail sheave 10, or when using my novel machine semi-automatically for cleaning up operations now to be described. This arrangement obviates the necessity of undue exposure of the operator to the obnoxious influence of dust stirred up in the car during the unloading operation.

*Adaptation to semi-automatic operation*

When it is desired to operate my novel shoveling machine to clean up the relatively small quantity of material left in the car 3 from the automatic unloading thereof, the master control switches 78 and 95 are left open and a master control switch 105 is closed and a mechanically operated trip switch 106 utilized. The control switch 105 and the trip switch 106 are serially connected in a circuit which includes part of the power lead 63, the lead 71, the contacts 72 and 73 of switch 42, part of the lead 75, a lead 107, part of the lead 77 between the time delay relay operated switch 79, the relay 70, the lead 80, and part of the power lead 64, switches 105 and 106 being interposed in series in the lead 107. A holding circuit for the relay 70 includes a holding switch 108 which is interposed in a lead 109 which shunts out the trip switch 106. With reference to the diagram of Fig. 11, it will be seen that the solenoid 40' which controls winding operation of the drum 18 is rendered inoperative during the semi-automatic operation of the machine due to the open condition of the master control switches 78 and 95.

The trip switch 106 is contained within a housing 110 mounted on the supporting structure 6 and is provided with an operating shaft 111 which projects laterally outwardly of the housing 110 and to which is rigidly secured a trip lever 112. A trip dog 113 is secured to the free end of the lever 112 for pivotal movements with respect thereto, as indicated at 114. The trip dog 113 is provided with an abutment portion 115 that engages a shoulder portion 116 on the lever 112 to limit swinging movements of the dog 113 with respect to the lever 112 in one direction. With reference to Figs. 3 and 5 to 7, inclusive, it will be seen that the free end portion of the trip dog 113 lies in the path of rotary travel of the extended ends of the pins 53 on the drum 13. The trip switch 106 is normally open and remains open as long as the drum 13 is stationary with the pins 53 thereof being out of engagement with the trip dog 113, or when the drum 13 is rotating in a cable unwinding direction. As shown in Fig. 7, rotation of the drum 13 in a cable unwinding direction will cause the pins 53 to engage the trip dog 113 and swing the same with respect to the trip lever 112 without affecting the trip switch 106. However, when the drum 13 is rotating in a cable winding direction, the pins 53 will engage the opposite side of the trip dog 113 causing it to move the trip lever 112 in a direction to close the trip switch 106 thereby energizing the relay 70 and causing energization of the solenoid 40 to effect engagement of the clutch 23 associated with the winding drum 13.

*Semi-automatic operation*

As above indicated, when it is desired to utilize my novel shoveling machine in a semi-automatic condition for cleaning up the grain remaining in the car 3, the master control switches 78 and 95 are opened and the master control switch 105 closed. The return cable 10 is then disconnected from the scoop 7 and together with the tail sheave 10 is removed from the car and permitted to wind up on the drum 18, the end thereof being made fast to any suitable location to prevent the drum 18 from spinning idly under influence of the low torque transfer coupling associated therewith. The operator then re-enters the car 3, and grasping the scoop by the handles normally provided thereon, pulls the scoop manually toward the end of the car 3 against the tendency of the low torque transfer coupling associated with the pull forward drum 13, the unwinding direction of rotation of the drum 13 having no effect upon the trip switch 106 except to cause relative movement between the trip dog 113 and the trip lever 112. When the scoop has been manually brought to the end of the car 3, the operator moves the scoop slightly in the direction of the shoveling machine whereupon the low torque transfer coupling 22 associated with the winding drum 13 will cause said drum 13 to rotate in a cable winding direction to take up the slack in the cable 8. Rotation of the drum 13 in a cable winding direction and for a very short distance will bring one of the pins 53 into engagement with the trip dog 113 and move the same in a direction to close the trip switch 106 whereby the relay 70 is energized, in turn causing energization of the solenoid 40 and consequent engagement of the elements of the high torque transfer coupling 23 associated with the winding drum 13. The winding drum 13 then pulls the scoop 7 forwardly under guidance of the operator until the scoop 7 has reached the door opening 4, whereupon the switch operating member 46 will engage the operating arm 45 of the switch 42 and cause said high torque transfer coupling 23 to uncouple the drum 13 from high torque engagement with the drive shaft 14. The operator then draws the scoop 7 toward the end of the car 3 and the cycle is repeated until the car is clean.

In Fig. 1, I have shown a pair of my novel shoveling machines being coupled together in tandem relationship and being driven from the single motor 16. With this arrangement, a single operator can set up one machine to automatically unload one end of car 3 while the other machine is being set up to unload the other end portion of the car. Then, while the second half of the car is being automatically unloaded, the operator can quickly and easily adapt the first machine to semi-automatic operation and clean out one half of the car, after which the second half may be cleaned by changing over the other shoveling machine to semi-automatic operation. I have found that by utilizing my novel machine in this manner, a car can be emptied of grain by a single operator in at least the same time that it has heretofore taken two or three men with prior art machines. Both halves of the car may be automatically unloaded simultaneously, and in the event that two operators are available, each machine may be used semi-automatically to clean up both ends of the car simultaneously, each operator manipulating a different shovel for the cleaning up operation.

The modified form of control, shown in Figs. 9 and 10, is designed to be used as a substitute for the motorized gear reducer 61, so that the operator may manually and remotely control the extent of return movement of the scoop 7. The control comprises a casing 117 from which extends a flexible cable or the like 118 having at its free end a coupling head 119 which is adapted to be connected to a coupling element 120 on the free end of the adjustment screw 58 which extends outwardly of the casing 43. The flexible shaft 118 is encased within a tubular casing 121 and is connected at its end contained within the casing 117 to a gear 122 journalled in a frame 123 suitably mounted in the casing 117. The gear 122 has meshing engagement with a gear 124 mounted on a shaft 125 which is journalled in the frame 123 and one end of which extends outwardly of the casing 117. A hand crank or the like 126 is rigidly secured to the outwardly extended end of the shaft 125, manipulation of which will cause rotation of the adjusting screw 58 and resultant movement of the switch 41 with respect to the switch 42. The inner end of the shaft 125 is provided with a worm 127 that has meshing engagement with a worm wheel or gear 128 that is mounted fast on a shaft 129 journalled in suitable bearings in the casing 117. One end of the shaft 129 extends through the casing 117 and has mounted thereon an indicating pointer 130 which cooperates with suitable indicia on the adjacent outer wheel of the casing 117 to indicate the extent of travel of the scoop 7 between its set limits of movement. The flexible shaft 118 may be of sufficient length to permit mounting of the above described controller in any convenient location, or the controller may be easily carried about by the operator in the vicinity of the shoveling machine.

My improved shoveling machine has been thoroughly tested and found to be completely satisfactory for the accomplishment of the objectives set forth; and, while I have shown and described a preferred embodiment and a single modification, it will be understood that the same is capable of further modification and that such modification may be made that does not depart from the spirit and scope of the invention as defined in the claims.

What I claim is:

1. In a device of the class described, a supporting structure, a cable winding drum journalled for rotation on the supporting structure, a drive shaft, power transmission mechanism connecting said drive shaft to said winding drum, said power transmission mechanism including a low torque transfer coupling unit comprising relatively rotary driving and driven elements the former of which is connected to the drive shaft and the latter of which is connected to the drum, a releasable high torque transfer coupling unit connecting the drive shaft to the drum, an actuator for the high torque transfer coupling unit operative to set and release the same, and control means for said actuator responsive to low torque transfer coupling unit imparted rotary movement of said drum in a cable winding direction to render said actuator operative to set the high torque transfer coupling unit, said control means including mechanism responsive to predetermined rotation of said drum in a cable winding direction to release said high torque transfer coupling unit.

2. In a device of the class described, a supporting structure, a continuously operating constant speed drive shaft journalled in said supporting structure, a cable winding drum journalled on said drive shaft, power transmission mechanism connecting said drive shaft to said winding drum, said power transmission mechanism including a low torque transfer coupling unit comprising relatively rotary driving and driven elements the former of which is connected to the drive shaft and the latter of which is connected to the drum, a releasable high torque transfer coupling unit connecting the drive shaft to the drum, an actuator for the high torque transfer coupling unit operative to set and release the same, and control means for said actuator responsive to low torque transfer coupling unit imparted rotary movement of said drum in a cable winding direction to render said actuator operative to set the high torque transfer coupling unit, said control means including mechanism responsive to predetermined rotation of said drum in a cable winding direction to release said high torque transfer coupling unit.

3. In a device of the class described, a supporting structure, a cable winding drum journalled for rotation on the supporting structure, a drive shaft, power transmission mechanism connecting said drive shaft to the winding drum, said power transmission mechanism including a low torque transfer coupling unit comprising relatively rotary driving and driven elements the former of which is connected to the drive shaft and the latter of which is connected to the drum, a releasable high torque transfer coupling unit connecting the drive shaft to the drum, an electrically operated actuator for setting and releasing the high torque transfer coupling unit, a power circuit including said actuator, and control means for said circuit including a switch responsive to low torque transfer coupling unit imparted rotary movement of said drum in a cable winding direction to render said actuator operative to set the high torque transfer unit and a limit switch operative responsive to predetermined rotation of said drum in a cable winding direction to release said high torque transfer coupling unit.

4. In a device of the class described, a supporting structure, a pair of cable winding drums journalled for rotation on said supporting structure, a drive shaft, power transmission mechanism connecting the drive shaft to each of said winding drums, said power transmission mechanism including a pair of low torque transfer coupling units one each associated with each of said drums and each comprising relatively rotary driving and driven elements the former of which is connected to the shaft and the latter of which is connected to a respective drum, a pair of independent releasable high torque transfer coupling units each connecting the drive shaft to a different drum, actuators for said high torque transfer coupling units independently operative to set and release the same, and control means for said actuators responsive to predetermined rotation of one of the drums in a cable winding direction to release the high torque transfer coupling unit associated with said one of the drums and to set the high torque transfer coupling units associated with the other of said drums, said control means being operative responsive to equal rotation of said one of the drums in the opposite direction to release the high torque transfer coupling unit associated with said other drum and to set the high torque transfer coupling unit for said one of the drums.

5. In a device of the class described, a supporting structure, a continuously operating constant speed drive shaft journalled in said supporting structure, a pair of cable winding drums journalled on said drive shaft in axially spaced relationship, power transmission mechanism independently connecting the drive shaft to each of said winding drums, said power transmission mechanism including a pair of low torque transfer coupling units one each associated with each of said drums and each comprising relatively rotary driving and driven elements the former of which is connected to the shaft and the latter of which is connected to a respective drum, a pair of independent releasable high torque transfer coupling units each connecting the drive shaft to a different drum, an actuator for each high torque transfer coupling unit independently operative to set and release the same, and control means for said actuators responsive to predetermined rotation of one of the drums in a cable winding direction to release the high torque transfer coupling unit associated with said one of the drums and to set the high torque transfer coupling units associated with the other of said drums, said control means being operative responsive to equal rotation of said one of the drums in the opposite direction to release the high torque transfer coupling unit associated with said other drum and to set the high torque transfer coupling unit for said one of the drums.

6. In a device of the class described, a supporting structure, a pair of cable winding drums journalled for rotation on said supporting structure, a drive shaft, power transmission mechanism connecting the drive shaft to each of said winding drums, said power transmission mechanism including a pair of low torque transfer coupling units one each associated with each of said drums and each comprising relatively rotary driving and driven elements the former of which is connected to the shaft and the latter of which is connected to a respective drum, a pair of independent releasable high torque transfer coupling units each connecting the drive shaft to a different drum, an electrically operated actuator for each high torque transfer coupling unit independently operative to set and release the same, a power circuit including said actuators, and control means for said circuit including switch mechanism responsive to predetermined rotation of one of the drums in a cable winding direction to cause one of the actuators to release the high torque transfer coupling unit associated with said one of the drums and to cause the other of said actuators to set the high torque transfer coupling unit associated with the other of said drums, said switch mechanism being operative responsive to equal rotation of said one of the drums in the opposite direction to cause the other of said actuators to release the high torque transfer coupling unit associated with said other drum and to set the high torque transfer coupling unit for said one of the drums.

7. The structure defined in claim 6 in which said switch mechanism includes a pair of spaced control switches and a switch actuator operatively associated with one of said drums and movable in opposite directions between said control switches responsive to rotation of said one of the drums in opposite directions to operate said control switches.

8. The structure defined in claim 6 in which said switch mechanism includes a pair of spaced control switches and a switch actuator operatively associated with said drum and movable in opposite directions between said control switches responsive to rotation of said one of the drums in opposite directions to operate said control switches, and in further combination with means mounting one of said control switches for movements toward and away from the other thereof, and mechanism for imparting said movements to said one of the switches whereby to increase or decrease the extent of high torque coupled rotary movement of said drums.

9. In a device of the class described, a supporting structure, a continuously operating constant speed drive shaft journalled in said supporting structure, a pair of cable winding drums journalled on said drive shaft in axially spaced relationship, power transmission mechanism independently connecting the drive shaft to each of said winding drums, said power transmission mechanism including a pair of low torque transfer coupling units one each associated with each of said drums and each comprising relatively rotary driving and driven elements the former of which is connected to the shaft and the latter of which is connected to a respective drum, a pair of independent releasable high torque transfer coupling units each connecting the drive shaft to a different drum, an electrically operated actuator for each high torque transfer coupling unit independently operative to set and release the same, a power circuit including said actuators, control means for said circuit including a pair of spaced control switches and a switch actuator operatively associated with one of said drums and movable in opposite directions between said control switches responsive to rotation of said one of the drums in opposite directions to operate said control switches, one of said control switches being operative to cause one of the coupling unit actuators to release the high torque transfer coupling unit associated with said one of the drums and to cause the other of said coupling unit actuators to set the high torque transfer coupling unit associated with the other of said drums responsive to predetermined rotation of said one of the drums in a cable winding direction, the other of said switches being operative to set the high torque transfer coupling unit associated with said one of the drums and to release the high torque transfer coupling unit associated with the other of said drums responsive to equal rotation of said one of the drums in the opposite direction, means mounting one of said control switches for movements toward and away from the other thereof, and mechanism for imparting said movements to said one of the switches to increase or decrease the extent of high torque coupled rotary movement of said drums, said last mentioned mechanism comprising a lead screw coupled to said one of the switches and having threaded engagement with said movable switch, and power driven means for rotating said lead screw.

10. The structure defined in claim 6 in which said switch mechanism includes a pair of spaced control switches and a switch actuator, said switch actuator being operatively associated with said drum and movable in opposite directions between said control switches, and in further combination with means mounting one of said control switches for movements toward and away from the other thereof, and manually-operated means for imparting said movements to said one of the switches whereby to increase or decrease the extent of high torque coupled rotary movement, the means for mounting said one of the control switches including a lead screw, said manually-operated means comprising a control unit remote from said switch and a flexible shaft connecting said control unit to said lead screw.

MENTOR C. ADDICKS.

References Cited in the file of this patent

UNITED STATES PATENTS

| Number | Name | Date |
|---|---|---|
| 637,143 | Miller | Nov. 14, 1899 |
| 1,020,066 | Westbrook | Mar. 12, 1912 |

FOREIGN PATENTS

| Number | Country | Date |
|---|---|---|
| 20,383 | Great Britain | of 1911 |